United States Patent
Wang et al.

(10) Patent No.: US 9,705,317 B2
(45) Date of Patent: Jul. 11, 2017

(54) POWER SUPPLY DEVICE AND OVERVOLTAGE PROTECTION METHOD

(71) Applicant: ASUS GLOBAL PTE. LTD., Singapore (SG)

(72) Inventors: Alison Wang, Singapore (SG); Surgy Liu, Singapore (SG); Herry Fan, Singapore (SG)

(73) Assignee: ASUS GLOBAL PTE. LTD., Singapore (SG)

( * ) Notice: Subject to any disclaimer, the term of this patent is extended or adjusted under 35 U.S.C. 154(b) by 106 days.

(21) Appl. No.: 14/684,440

(22) Filed: Apr. 13, 2015

(65) Prior Publication Data

US 2015/0303685 A1    Oct. 22, 2015

(30) Foreign Application Priority Data

Apr. 18, 2014    (CN) .......................... 2014 1 0157762

(51) Int. Cl.
*H02H 9/04*    (2006.01)
*H02M 3/158*   (2006.01)
*H02M 1/32*    (2007.01)

(52) U.S. Cl.
CPC ............. *H02H 9/041* (2013.01); *H02M 1/32* (2013.01); *H02M 3/1588* (2013.01); *Y02B 70/1466* (2013.01)

(58) Field of Classification Search
CPC ........ H02M 3/1588; H02M 1/36; H02M 1/08; H02M 3/33507; H02M 1/32; H02M 3/158; Y02B 70/1466; H02H 9/041; H02H 9/043; H02H 9/04
See application file for complete search history.

(56) References Cited

U.S. PATENT DOCUMENTS

| | | | |
|---|---|---|---|
| 2010/0123978 A1* | 5/2010 | Lin | ....................... H02H 7/1213 361/18 |
| 2011/0018613 A1* | 1/2011 | Wang | .................. H02M 3/1588 327/530 |
| 2012/0091978 A1* | 4/2012 | Ishii | ........................ H02M 1/36 323/271 |
| 2012/0230059 A1* | 9/2012 | Adragna | ............. H02M 3/3376 363/16 |

(Continued)

FOREIGN PATENT DOCUMENTS

| | | |
|---|---|---|
| CN | 102035380 A | 4/2011 |
| CN | 102136717 A | 7/2011 |
| CN | 202042890 U | 11/2011 |

*Primary Examiner* — Gustavo Rosario Benitez
(74) *Attorney, Agent, or Firm* — CKC & Partners Co., Ltd.

(57) ABSTRACT

A power supply device and an overvoltage protection method are disclosed. The power supply device includes an energy storage unit, a first switch, a second switch and a driving module. The energy storage unit generates a driving voltage according to a supplied voltage. The first switch selectively transmits the supplied voltage to the energy storage unit according to a first driving signal. The second switch is selectively conducted to adjust the driving voltage according to a second driving signal. The driving module conducts the second switch when the supplied voltage is rose at a first predetermined value, and generates the first driving signal and the second driving signal after the supplied voltage is rose at a second predetermined value. The first predetermined value is smaller than the second predetermined value.

9 Claims, 7 Drawing Sheets

(56) References Cited

U.S. PATENT DOCUMENTS

2014/0118873 A1* 5/2014 Lee .................. H02H 9/041
                                                                   361/91.5
2014/0300179 A1* 10/2014 Ubukata ............ B60L 11/14
                                                                   307/9.1

* cited by examiner

POWER SUPPLY DEVICE AND OVERVOLTAGE PROTECTION METHOD

CROSS-REFERENCE TO RELATED APPLICATION

This application claims the priority benefit of China application serial No. 201410157762.2, filed on Apr. 18, 2014. The entirety of the above-mentioned patent application is hereby incorporated by references herein and made a part of specification.

BACKGROUND OF THE INVENTION

Field of the Invention

The invention relates to a power supply device and, more particularly, to a power supply device with an overvoltage protection function.

Description of the Related Art

In general, a power supply device is usually used to provide an appropriate driving voltage to operate an electronic product. Various protection mechanisms, such as an overvoltage protection, may be installed to the power supply device to avoid an instable power damages the electronic products.

The power supply device may use multiple power switches to adjust the driving voltage to provide a stable driving voltage in the system operation. However, when the power switches fail accidentally, the overvoltage protection mechanism may not be enabled while the electronic product is booted in this situation. Thus the external supplied voltage may be directly inputted to the electronic product, which results m a permanent damage.

BRIEF SUMMARY OF THE INVENTION

A power supply device includes an energy storage unit, a first switch, a second switch and a driving module is disclosed herein. The energy storage unit generates a driving voltage to a load circuit according to a supplied voltage. The first switch selectively transmits the supplied voltage to the energy storage unit according to a first driving signal. The second switch is selectively conducted according to the second driving signal to adjust the driving voltage. The driving module conducts the second switch when the supplied voltage rises at a first predetermined value, and generates the first driving signal and the second driving signal after the supplied voltage rises at a second predetermined value. The first predetermined value is smaller than the second predetermined value.

An overvoltage protection method applied to a power supply device is provided. The power supply device includes a first switch and a second switch. A first end of the first switch receives a supplied voltage, and the second switch is electrically coupled between a second end of the first switch and a ground. The overvoltage protection method includes following steps: conducting the second switch when the supplied voltage rises at a first predetermined value; and generating a pulse width modulation (PWM) signal to a driver via a PWM controller when the supplied voltage rises at a second predetermined value to make the driver drive the first switch and the second switch according to the PWM signal. The first predetermined value is smaller than the second predetermined value.

These and other features, aspects and advantages of the present invention will become better understood with regard to the following description, appended claims, and accompanying drawings.

DETAILED DESCRIPTION OF THE EMBODIMENTS

Figure 1A:
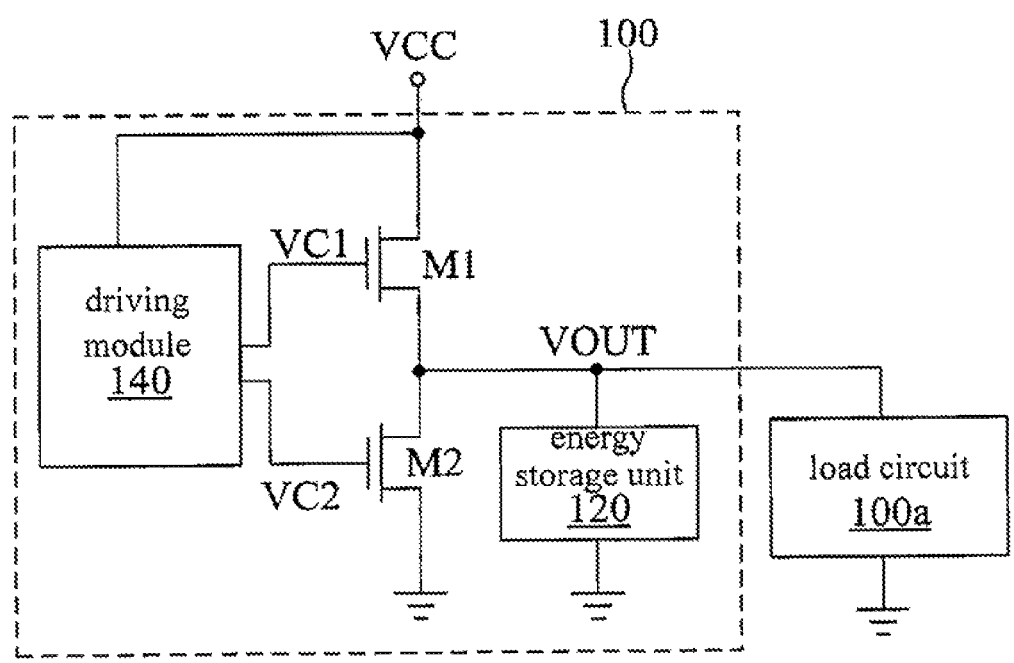
FIG. 1A is a schematic diagram showing a power supply device in an embodiment.

FIG. 1A is a schematic diagram showing a power supply device 100 in an embodiment. The power supply device 100 includes an energy storage unit 120, a switch M1, a switch M2 and a driving module 140. A first end of the switch M1 receives a supplied voltage VCC, a second end of the switch M1 is electrically coupled to the energy storage unit 120, and a control end of the switch M1 receives a driving signal VC1. A first end of the switch M2 is electrically coupled to the second end of the switch M1, a second end of the switch M2 is electrically coupled to a ground, and a control end of the switch M2 receives a driving signal VC2. Thus, the switch M1 can be selectively conducted according to the driving signal VC1 to transmit the supplied voltage VCC to the energy storage unit 120 and generate a driving voltage VOUT. The switch M2 is selectively conducted according to the driving signal VC2 to adjust the driving voltage VOUT. The switch M1 and the switch M2 may include various types of power transistors. The driving module 140 is electrically coupled to the switch M1 and the switch M2, and it is driven by the supplied voltage VCC.

Figure 1B:
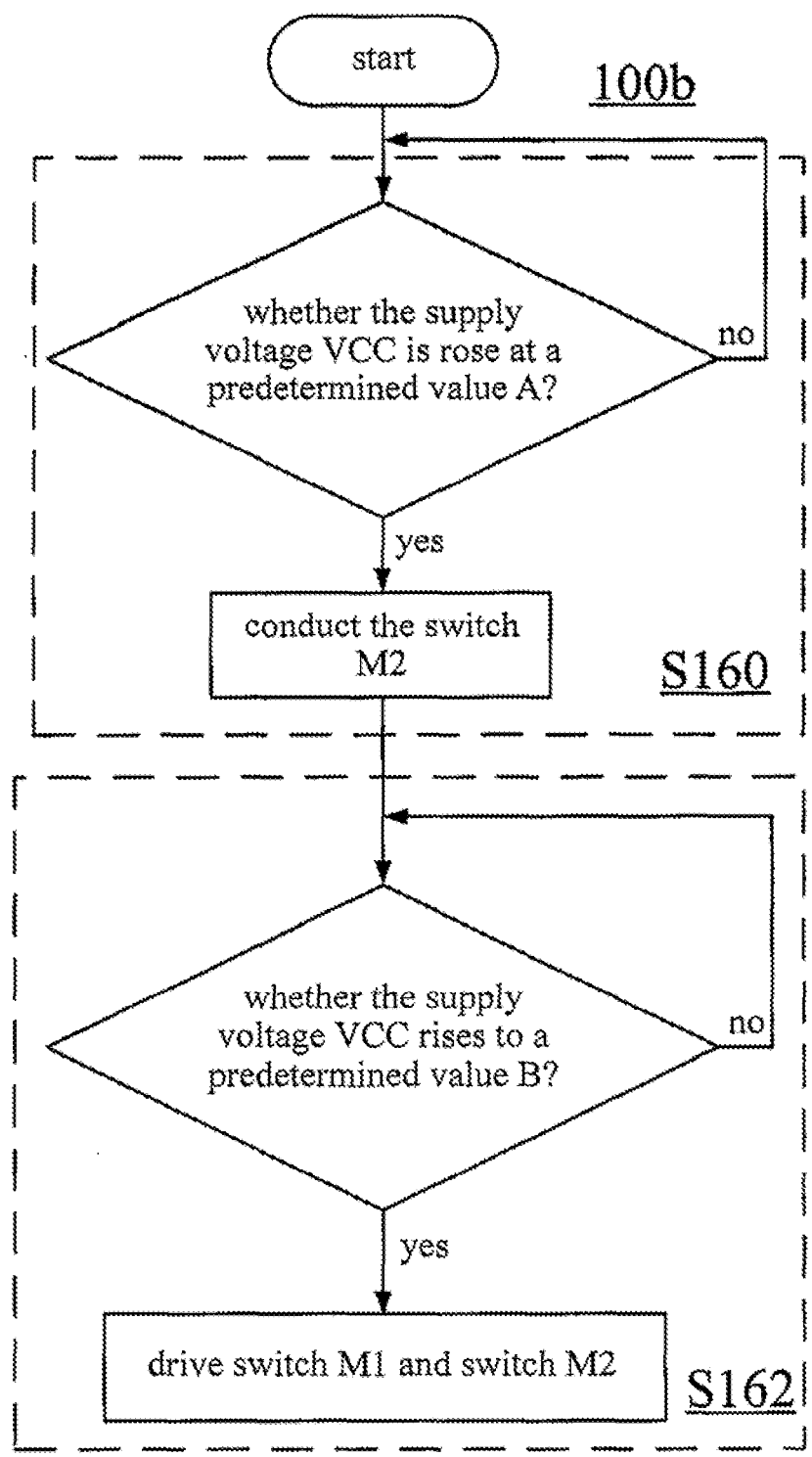
FIG. 1B is a flow chart showing an overvoltage protection method in an embodiment.

FIG. 1B is a flow chart showing an overvoltage protection method 100b in an embodiment. Please refer to FIG. 1A and FIG. 1B, operations of the electronic device 100 in FIG. 1A and the overvoltage protection method 100b are illustrated together. As shown in FIG. 1B, the overvoltage protection method 100b includes step S160 and step S162.

In the step S160, when the system boots up, the supplied voltage VCC rises at a predetermined value A. The driving module 140 switches the driving signal VC2 to an enabled state (such as a high level voltage) to conduct the switch M2. Thus, when the switch M1 is broken, the supplied voltage VCC can he transmitted to the ground via the switch M2.

In the step S162, the supplied voltage VCC rises at a value (which is called as a predetermined value B in the following) that can make the driving module 140 operate normally. The driving module 140 generates the driving signal VC1 and the driving signal VC2 according to the PWM signal (which is the PWM signal PWM shown in FIG. 2) to drive the switch M1 and the switch M2, and outputs the driving voltage VOUT to drive a load circuit 100a. The predetermined value A is smaller than the predetermined value B.

This is, if the switch M1 is broken before the system boots up, the driving module 140 can conduct the switch M2 before the power supply device 100 operates (which means before the supplied voltage VCC rises at the predetermined value B), and the supplied voltage VCC can be transmitted to the ground to avoid that the supplied voltage VCC is directly inputted to the energy storage unit 120 and a driving voltage VOUT is generated by mistakes. Thus, a complete voltage protection is provided to the load circuit 100a via the configuration stated above, which improves the stableness of the whole system.

Moreover, the driving module 140 includes a PWM controller 142 and a driver 144. After the supplied voltage VCC rises at the predetermined value B, the PWM controller 142 generates the PWM signal PWM to the driver 144. The driver 144 is electrically coupled to the PWM controller 142, and generates the driving signal VC1 and the driving signal VC2 according to the PWM signal PWM to drive the switch M1 and the switch M2, so as to adjust the driving voltage VOUT.

The functions and operations of the power supply device 100 can be achieved in the following embodiments, which is not limited herein.

Figure 2:
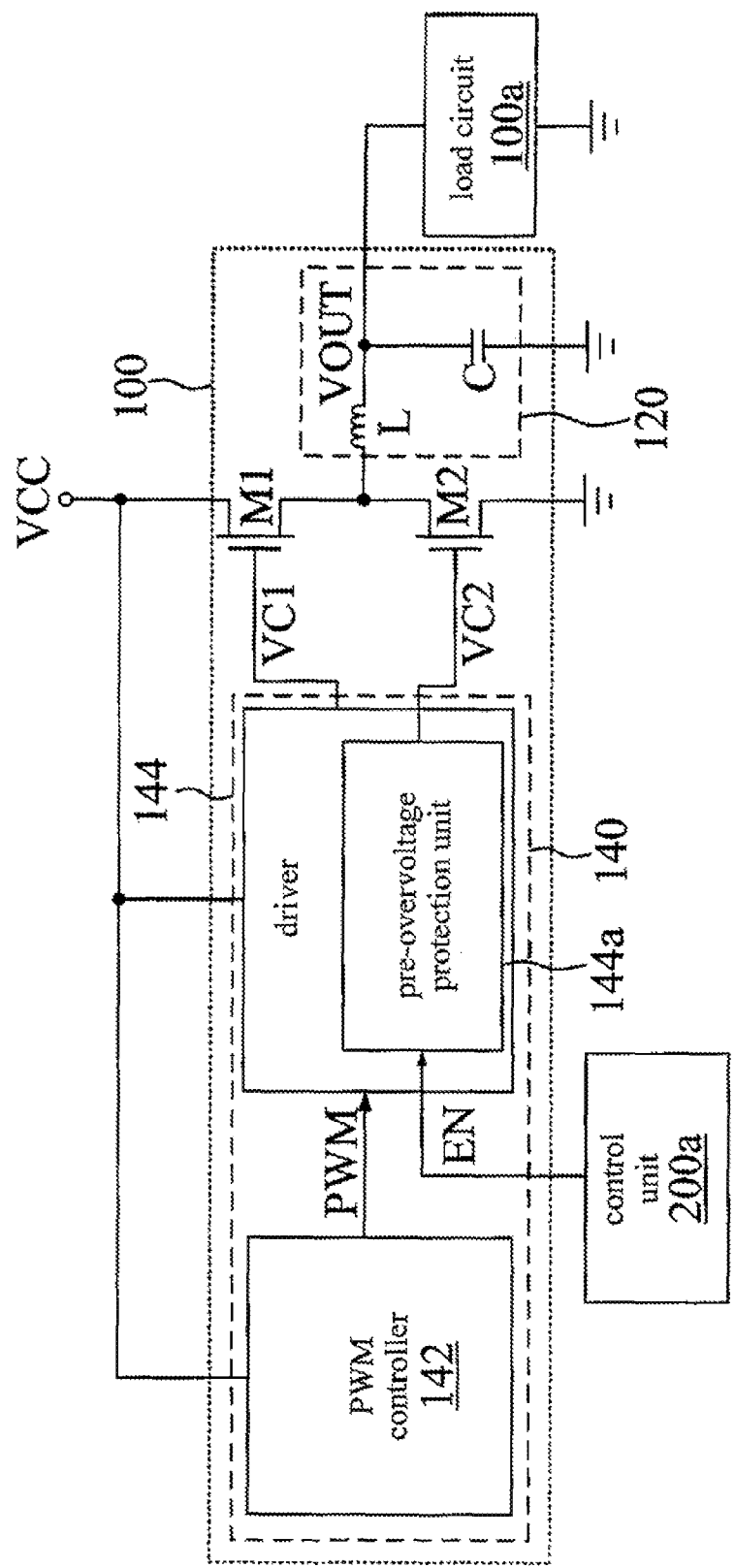
FIG. 2 is a schematic diagram showing details of the power supply device in FIG. 1A.

FIG. 2 is a schematic diagram showing details of the power supply device 100 in FIG. 1A. As shown in FIG. 2, the energy storage unit 120 includes an inductor L and a capacitor C. A first end of the inductor L is electrically coupled to a second end of the switch M1, and a second end of the inductor L is electrically coupled to the load circuit 100a. The capacitor C is electrically coupled between the second end of the inductor L and the ground.

In the embodiment, the driver 144 includes a pre-overvoltage protection unit 144a. When the supplied voltage VCC rises at the predetermined value A, the pre-overvoltage protection unit 144a adjusts the driving signal VC2 to conduct the switch M2. In other words, the pre-overvoltage protection unit 144a is configured to operate at a voltage lower than the predetermined value B (such as the predetermined value A). Before the power supply device 100 operates, the switch M2 is conducted, and thus the supplied voltage VCC can be transmitted to the ground via the switch M2 if the switch M1 is short-circuited. Consequently, a primary overvoltage protection on the load circuit 100a is executed when the system boots up.

The driving module 140 may be a control chip, and the PWM controller 142 may also be achieved via the pulse frequency modulation technology, which is not limited and can be changed according to practical requirements.

The load circuit 100a may be a central processing unit (CPU), which is not limited herein. The pre-overvoltage protection unit 144a receives a control signal EN, and stops adjusting the driving signal VC2 when the control signal EN switches to an enabled state. In detail, as shown in FIG. 2, the control signal EN is sent out by a control unit 200a, and the control unit 200a is a controller at a circuit board or a motherboard which includes the CPU. When the supplied voltage VCC stably rises at the predetermined value B, it means that a power-on reset of the driver 144 is finished, and the control unit 200a transmits the control signal EN at an enabled state to the pre-overvoltage protection unit 144a. The pre-overvoltage protection unit 144a stops adjusting the driving signal VC2, and the driver 144 starts to operate according to the PWM signal PWM.

Figure 3A:
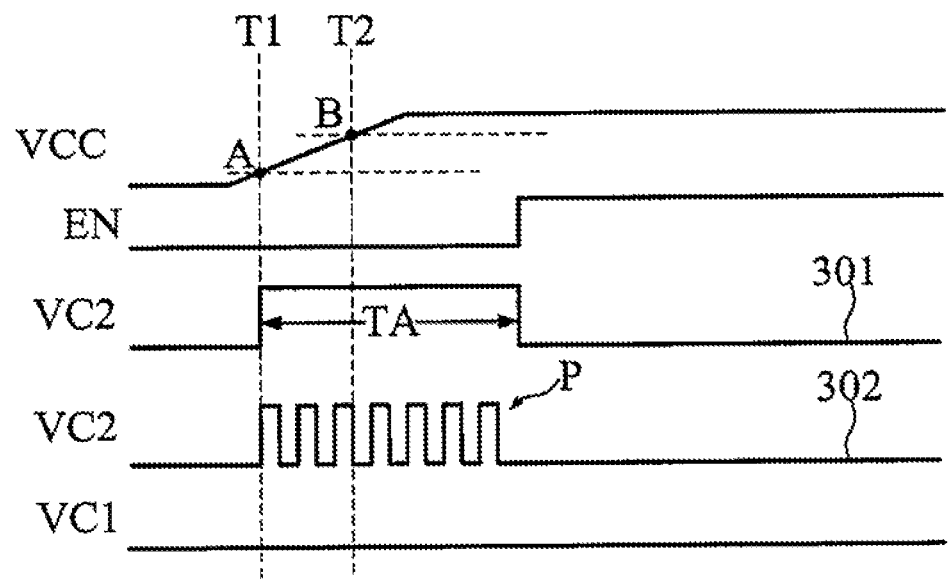
FIG. 3A is a waveform graph of the power supply device in FIG. 2 when it operate normally.

Details of operation of the power supply device 100 are illustrated with waveform graphs as follows. FIG. 3A is a waveform graph of the power supply device 100 in FIG. 2 when it operates normally.

Please refer to FIG. 2 and FIG. 3A, when the system boots up, the external supplied voltage VCC rises gradually. At the time point T1, the supplied voltage VCC rises at the predetermined value A, and the pre-overvoltage protection unit 144a starts to operate. The driving signal VC2 (please refer to the waveform 301) switches to a high level voltage (which means entering an enabled state TA) to conduct the switch M2. Thus, if the switch M1 is short-circuited, the supplied voltage VCC can be transmitted to the ground via the switch M2.

In another embodiment, the supplied voltage VCC rises at the predetermined value A, the pre-overvoltage protection unit 144a can generate the driving signal VC2 with continuous pulse waves P (please refer to the waveform 302), so as to conduct the switch M2 alternately in a specific period. Thus, if the switch M1 is short-circuited, the supplied voltage VCC cannot continuously charge the energy storage unit 120 and an excessive driving voltage VOUT would not be generated.

At the time point T2, after the supplied voltage VCC rises at the predetermined value B and continues rising to a stable voltage, the control unit 200a switches the control signal EN to an enabled state to make the pre-overvoltage protection unit 144a stop adjusting the driving signal VC2. Then, the driver 144 starts to operate according to the PWM signal PWM (not shown).

Figure 3B:
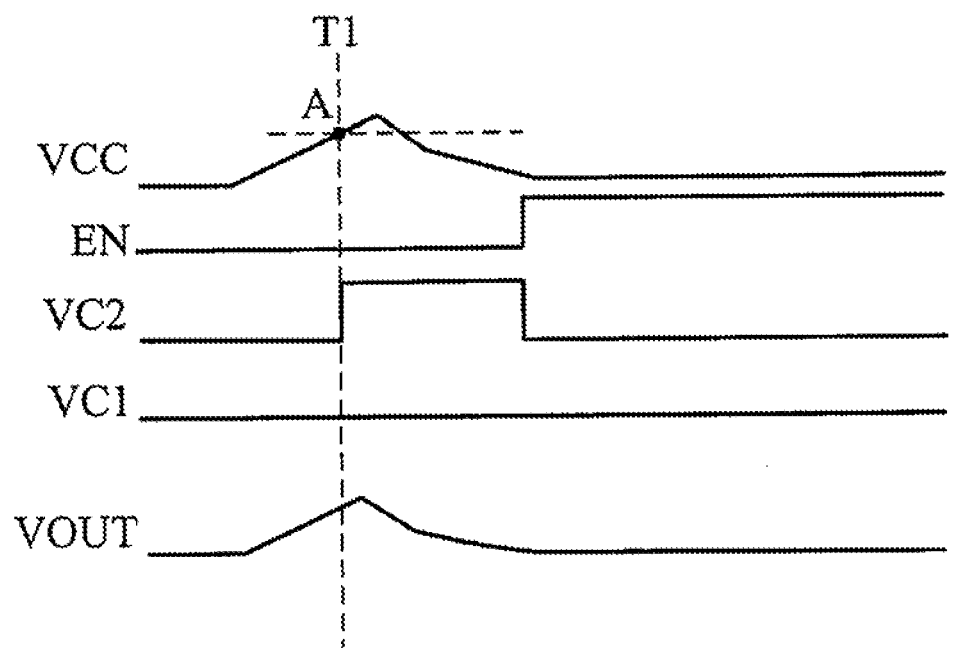
FIG. 3B is a waveform graph of the power supply device in FIG. 2 in booting after a switch M1 is broken.

FIG. 3B is a waveform graph of the power supply device 100 in FIG. 2 in booting after the switch M1 is broken. As shown in FIG. 3B, if the switch M1 is broken before the system boots up, the supplied voltage VCC may be directly inputted to the energy storage unit 120 via the switch M1, and the driving voltage VOUT rises incorrectly.

Similarly, at the time point T1, when the supplied voltage VCC rises at the predetermined value A, the pre-overvoltage protection unit 144a starts to operate and switches the driving signal VC2 to an enabled state TA to conduct the switch M2. Consequently, when the switch M1 is short-circuited, the supplied voltage VCC can be transmitted to the ground via the switch M2, and the energy stored in the energy storage unit 120 can also be released via the switch M2. Then, the driving voltage VOUT decreases, and a damage of the load circuit 100a can be avoided.

Figure 3C:
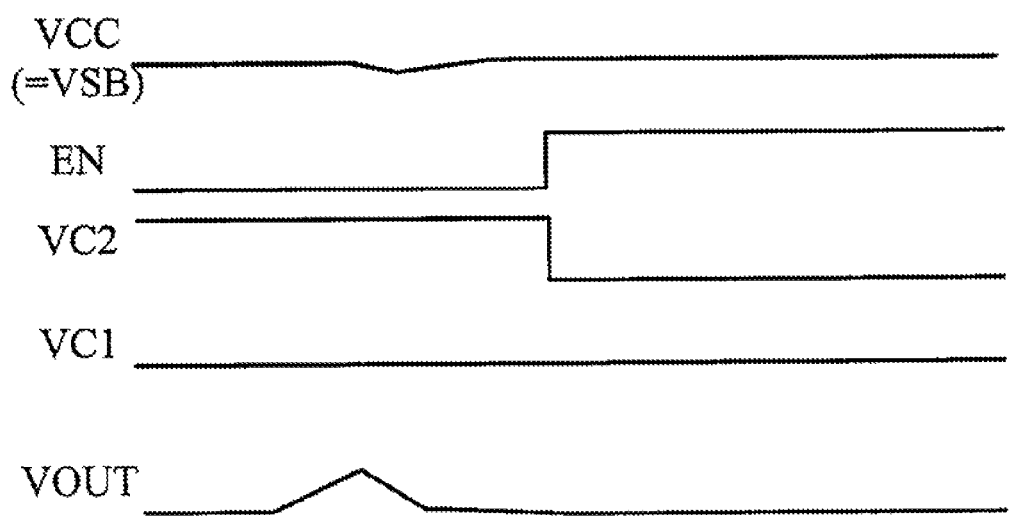
FIG. 3C is a waveform graph of the power supply device in FIG. 2 after the switch is broken and a supplied voltage is a standby voltage.

FIG. 3C is a waveform graph of the power supply device 100 in FIG. 2 after the switch M1 is broken and a supplied voltage is a standby voltage. In an embodiment, the predetermined value B may be a standby voltage value VSB, and thus when the power supply device 100 enters a standby mode, the voltage protection operation can be maintained.

In the embodiment, when the supplied voltage VCC switches to the standby voltage VSB, the pre-overvoltage protection unit 144a switches the driving signal VC2 to a high level voltage to conduct the switch M2. Consequently, even though the switch M1 is broken in the standby mode, the driving voltage VOUT would not rise incorrectly, and the load circuit 100a can be protected via the configuration stated above.

Figure 4A:
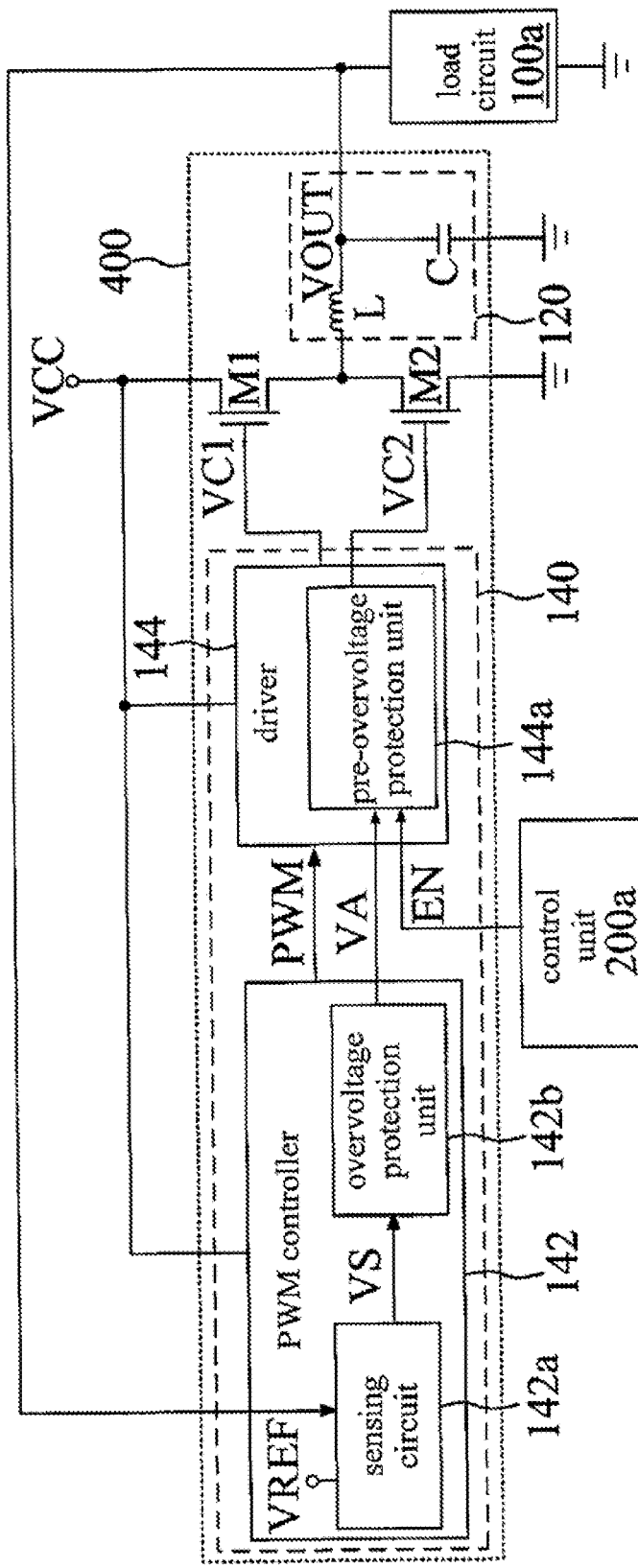
FIG. 4A is a schematic diagram showing a power supply device in another embodiment.

FIG. 4A is a schematic diagram showing a power supply device 400 in another embodiment. Compared with the power supply device 100 in FIG. 2, the PWM controller 142 in FIG. 4A further includes a sensing circuit 142a and an overvoltage protection unit 142b.

The sensing circuit 142a detects the driving voltage VOUT, compares it with a reference voltage VREF and generates a sensing signal VS. In a normal operation, the sensing circuit 142a outputs a sensing signal VS with a high level voltage. When the driving voltage VOUT is higher than the reference voltage VREF, the sensing circuit 142a outputs a sensing signal VS with a low level voltage. The overvoltage protection unit 142b outputs an adjusting signal VA to the driver 144 according to the sensing signal VS, and switches the control signal EN to a disabled state (which means a low level voltage). Thus, when the system starts to operate and the driving voltage VOUT is higher than the reference voltage VREF, the pre-over-voltage protection unit 144a switches the driving signal VC2 to the high level voltage again to conduct the switch M2, and the supplied voltage VCC can be transmitted to the ground to further protect the load circuit 100a. The sensing circuit 142a may also be disposed outside the PWM controller 142, which is not limited and can be flexibly designed according to practical requirements.

Figure 4B:
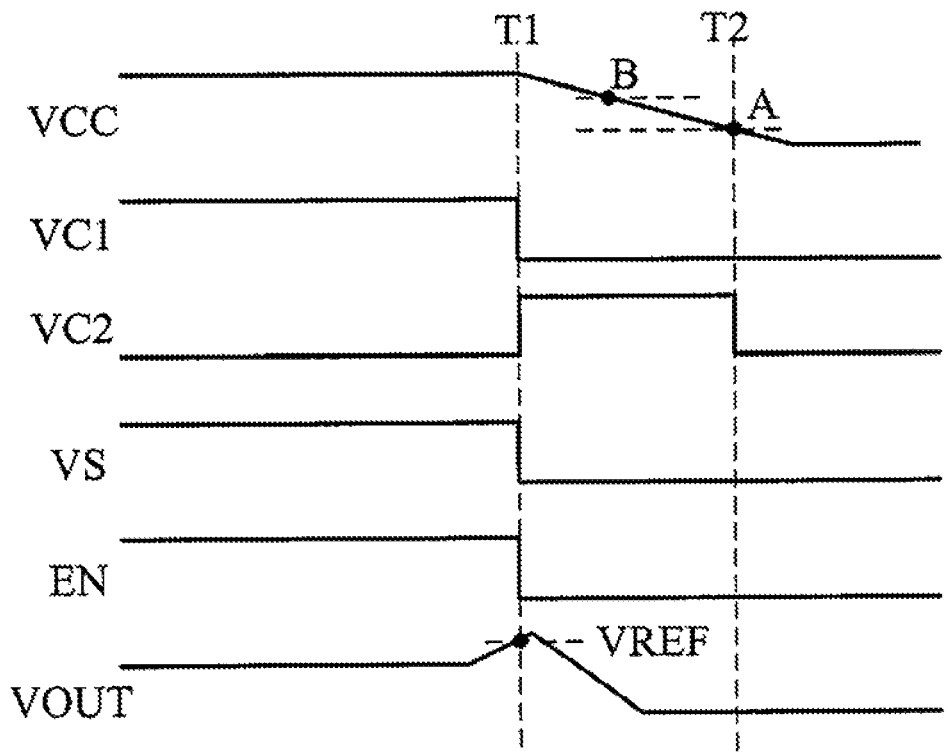
FIG. 4B is a waveform graph of the power supply device in FIG. 4A when a switch is broken after booting.

FIG. 4B is a waveform graph of the power supply device 400 in FIG. 4A when the switch M1 is broken after booting. Please refer to FIG. 4A and FIG. 4B, before the time point T1, the power supply device 400 outputs a stable driving voltage VOUT, and thus the control signal EN and the sensing signal VS are in high level voltage under a normal operation.

At the time point T1, the switch M1 suddenly breaks down, and the driving voltage VOUT rises abnormally and exceeds the reference voltage VREF. The sensing circuit 142a switches the sensing signal VS to a low level voltage. Then, the driver 144 switches the control signal EN to a disabled state, and the pre-overvoltage protection unit 144a switches the driving signal VC2 to a high level voltage to conduct the switch M2. Thus, the energy stored in the energy storage unit 120 can be transmitted to the ground via the switch M2, and the driving voltage VOUT decreases gradually.

At the same time, if the switch M1 is short-circuited, since the switch M2 is already conducted, the supplied voltage VCC is transmitted to the ground via the switch M2 and decreases gradually. In another state, when the switch M1 is broken and excessive current flows through the switch M1 and the switch M2, the supplied voltage VCC is reduced by an overcurrent circuit (not shown) and starts to decrease.

At the time point T2, the supplied voltage VCC decreases until it is lower than the predetermined value A. The pre-overvoltage protection unit 144a stops operating, and thus the driving signal VC2 switches to a low level voltage.

The power supply device 400 can provide a further overvoltage protection operation via the configuration stated above after the system boots up and starts to operate normally. After the driving module 140 operates normally, if the switch M1 is broken, the power supply device 400 can conduct the switch M2 in time to provide an improved overvoltage protection for the load circuit 100a.

Figure 5:
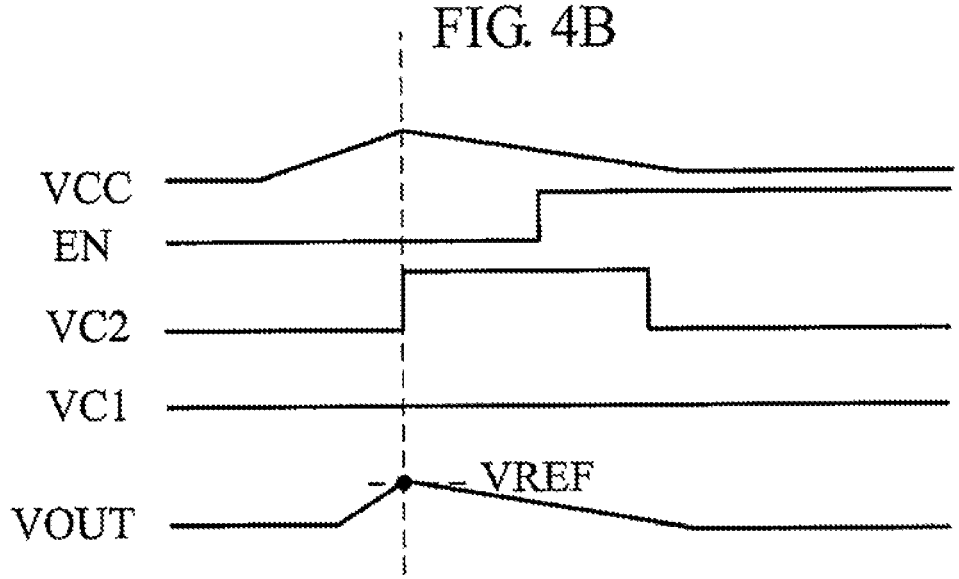
FIG. 5 is a waveform graph of the power supply device in FIG. 4A in booting after a switch M1 is broken.

FIG. 5 is a waveform graph of the power supply device 400 in FIG. 4A in booting after the switch M1 is broken. The sensing circuit 142a may also be integrated to the driver 144 in other embodiments. In other words, the driver 144 can also detect the driving voltage VOUT and compare the driving voltage VOUT and the reference voltage VREF. For example, as shown in FIG. 5, if the switch M1 is already broken, in the system booting, and when the driver 144 detects that the driving voltage VOUT is higher than the reference voltage VREF, the pre-overvoltage protection unit 144a switches the driving signal VC2 to a high level voltage to conduct the switch M2, and thus the driving voltage VOUT is reduced.

In sum, the power supply device can provide an effective overvoltage protection in the system booting process, and also provides a further overvoltage protection after the system operates normally. Consequently, the reliability and the operation security of the load circuit can be improved.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:
1. A power supply device, comprising:
an energy storage unit configured to generate a driving voltage to a load circuit according to a supplied voltage;
a first switch configured to selectively transmit the supplied voltage to the energy storage unit according to a first driving signal;
a second switch configured to selectively conduct according to a second driving signal for adjusting the driving voltage; and
a driving module configured to conduct the second switch when the supplied voltage rises at a first predetermined value, and generate the first driving signal and the second driving signal when the supplied voltage rises at a second predetermined value, wherein the first predetermined value is smaller than the second predetermined value,
wherein when the power supply device boots up and the supplied voltage rises at the first predetermined value, the second switch conducts to transmit the supplied voltage to a ground via the second switch if the first switch is short-circuited,
wherein the driving module includes:
a pulse width modulation (PWM) controller configured to generate a PWM signal when the supplied voltage rises at the second predetermined value; and
a driver configured to generate the first driving signal and the second driving signal according to the PWM signal, wherein the driver includes:
a pre-overvoltage protection unit configured to adjust the second driving signal to transmit the supplied voltage to the ground via the second switch, when the supplied voltage rises at the first predetermined value.

2. The power supply device according to claim 1, wherein when the supplied voltage rises at the first predetermined value, the pre-overvoltage protection unit switches the second driving signal to a high level voltage to conduct the second switch.

3. The power supply device according to claim 1, wherein when the supplied voltage rises at the first predetermined value, the pre-overvoltage protection unit provides a driving signal with continuous pulse waves to conduct the second switch alternately.

4. The power supply device according to claim 1, wherein the pre-overvoltage protection unit receives a control signal from a control unit and stops adjusting the second driving signal when the control signal switches to an enabled state.

5. The power supply device according to claim 4, wherein the PWM controller further includes:
a sensing circuit configured to output a sensing signal when the driving voltage is higher than a reference voltage; and an overvoltage protection unit configured to output an adjusting signal to the driver according to the sensing signal to switch the control signal to a disabled state.

6. The power supply device according to claim 4, wherein after the supplied voltage rises at the second predetermined value, the driver compares a reference voltage and the driving voltage and conducts the second switch when the driving voltage is higher than the reference voltage.

7. An overvoltage protection method for a power supply device, wherein the power supply device includes a first switch and a second switch, a first end of the first switch receives a supplied voltage, and the second switch is electrically coupled between a second end of the first switch and a ground, the overvoltage protection method comprising following steps:

conducting the second switch when the supplied voltage rises at a first predetermined value; and generating a PWM signal to driver via a PWM controller when the supplied voltage rises at a second predetermined value to make the driver drive the first switch and the second switch according to the PWM signal, wherein the first predetermined value is smaller than the second predetermined value, wherein when the power supply device boots up and the supplied voltage rises at the first predetermined value, the second switch conducts to transmit the supply voltage to a ground via the second switch if the first switch is short-circuited.

8. The overvoltage protection method according to claim 7, wherein when the supplied voltage rises at the first predetermined value, a driving signal with continuous pulse waves is provided to a control end of the second switch.

9. The overvoltage protection method according to claim 7, wherein the first switch and the second switch adjusts a driving voltage via the driver, and the overvoltage protection method further includes following steps:

comparing the driving voltage and a reference voltage; and conducting the second switch when the driving voltage is higher than the reference voltage.

* * * * *